(12) United States Patent
Aoyama et al.

(10) Patent No.: US 9,413,275 B2
(45) Date of Patent: Aug. 9, 2016

(54) MOTOR CONTROL DEVICE

(71) Applicant: Mitsubishi Electric Corporation, Chiyoda-ku, Tokyo (JP)

(72) Inventors: Atsushi Aoyama, Chiyoda-ku (JP); Shinsuke Ui, Chiyoda-ku (JP); Kazuyuki Adachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 68 days.

(21) Appl. No.: 14/460,594

(22) Filed: Aug. 15, 2014

(65) Prior Publication Data
US 2015/0256110 A1    Sep. 10, 2015

(30) Foreign Application Priority Data
Mar. 7, 2014   (JP) .................................. 2014-44533

(51) Int. Cl.
*H02P 23/00* (2016.01)
*H02P 6/00* (2016.01)

(52) U.S. Cl.
CPC ....................... *H02P 6/002* (2013.01)

(58) Field of Classification Search
CPC .............. H02P 6/14; H02P 6/16; H02K 29/12
USPC ............ 318/811, 599, 798, 800, 801, 400.37, 318/400.38
See application file for complete search history.

(56) References Cited

U.S. PATENT DOCUMENTS

| | | | | |
|---|---|---|---|---|
| 5,371,645 A | * | 12/1994 | Mochizuki | H02H 7/0833 361/22 |
| 2009/0167220 A1 | * | 7/2009 | Kanamori | H02P 6/20 318/400.11 |
| 2009/0265066 A1 | * | 10/2009 | Ogawa | F16H 61/12 701/55 |
| 2009/0289593 A1 | * | 11/2009 | Okabe | F16D 48/064 318/647 |
| 2010/0060211 A1 | * | 3/2010 | Hashimoto | H02P 27/08 318/400.02 |
| 2010/0244754 A1 | * | 9/2010 | Marumoto | H02P 25/021 318/400.11 |
| 2011/0080126 A1 | | 4/2011 | Yabuguchi et al. | |
| 2011/0133678 A1 | * | 6/2011 | Tomigashi | H02P 21/0035 318/400.04 |

FOREIGN PATENT DOCUMENTS

| | | |
|---|---|---|
| DE | 102008018075 A1 | 10/2009 |
| DE | 102008043114 A1 | 4/2010 |

(Continued)

OTHER PUBLICATIONS

Communication dated Nov. 11, 2014 from the Japanese Patent Office in counterpart application No. 2014-044533.

(Continued)

*Primary Examiner* — Rina Duda
(74) *Attorney, Agent, or Firm* — Sughrue Mion, PLLC (57) ABSTRACT

A motor control device includes: a current detection portion provided to an inverter and detecting a current flowing to a motor due to a voltage generated across a current detection resistor, a timing measurement portion measuring a conduction pattern switching timing by the inverter and a current detection timing by the current detection portion, and a correction portion finding a correction current value using a current value detected by the current detection portion and the conduction pattern switching timing and the current detection timing measured by the timing measurement portion. The motor control device configured as above can enhance detection accuracy of a motor current.

3 Claims, 6 Drawing Sheets

(56) References Cited

FOREIGN PATENT DOCUMENTS

| | | |
|---|---|---|
| JP | 2009-281538 A | 12/2009 |
| JP | 2011-78291 A | 4/2011 |
| JP | 2013-115884 A | 6/2013 |

OTHER PUBLICATIONS

Communication dated Jan. 8, 2016 from the German Patent and Trademark Office issued in corresponding Application No. 10 2014 222 665.1.

* cited by examiner

MOTOR CONTROL DEVICE

BACKGROUND OF THE INVENTION

1. Field of the Invention

The present invention relates to a motor control device that controls, for example, a brushless motor used in an automatic transmission mounted on a vehicle, such as an automobile.

2. Description of the Background Art

Generally, a vehicle, such as an automobile, equipped with an automatic transmission uses an engine as a power source and is enabled to run by transmitting motive power generated by the engine to wheels via the automatic transmission. A start clutch is provided inside the automatic transmission and the start clutch is engaged when motive power transmitted from the engine is transmitted to a gear mechanism. Conversely, the start clutch is disengaged when motive power transmitted from the engine is not transmitted to the gear mechanism. It is configured for the start clutch to be engaged and disengaged under the control of a clutch control portion.

In case an engaging force of the clutch becomes unstable, motive power transmitted from the engine to the gear mechanism becomes unstable and eventually motive power transmitted to the wheels becomes unstable. A running condition of the automobile thus becomes unsteady, which makes the driver feel uncomfortable. Hence, in order to ensure a steady running condition of a vehicle, it is necessary to control an engaging force of the start clutch with accuracy.

Incidentally, there is an automatic transmission that transmits motive power from the engine to the gear mechanism using the start clutch as described above. In this automatic transmission with the start clutch, an actuator is equipped to a dry-type single-plate start clutch so that a clutch engaging force is adjusted by varying a stroke amount of the start clutch using the actuator. For a mechanism in which a motor is used as the actuator and a rotational angle of the motor is proportional to a stroke amount of the start clutch, it is necessary to adjust an amount of torque of the motor with accuracy in order to adjust an engaging force of the start clutch.

Because an amount of torque of the motor is proportional to an amount of current of the motor, it is necessary to enhance accuracy of current control of the motor in order to adjust an amount of torque of the motor with accuracy. There is a motor control device that controls an amount of torque of the motor by applying feedback control to the current control of the motor. It is, however, crucial for such a motor control device to detect a current of the motor with accuracy.

A motor current detection method is proposed, for example, in Patent Document 1. This is a method of suppressing a variance of a detection current value in a control device of a brushless motor of a 120° rectangular wave conduction method by detecting a current at timing at which a motor current reaches a peak value when switching ON-and-OFF patterns (hereinafter, referred to as the conduction patterns) of respective FETs (Field Effect Transistors) forming a motor drive circuit in synchronization with edge signals of multiple hall sensor signals used to detect a position of a rotor with respect to a stator of the brushless motor.

Another technique of detecting a motor current is proposed, for example, in Patent Document 2. According to this technique, a current detected in every current detection cycle is approximated to a straight line and a motor current at a predetermined timing is calculated by a correction calculation using the current detection cycle and a time taken until an applied voltage is actually applied to the motor.

[Patent Document 1] JP-A-2009-281538
[Patent Document 2] JP-A-2011-78291

When the technique disclosed in Patent Document 1 is applied to the motor control device in the related art, because a command voltage is kept applied since a current detection timing till a conduction pattern switching timing, a motor current rises from the current detection timing to the conduction pattern switching timing. Hence, an error occurs between a detection current value detected at the current detection timing and the peak value of the motor current that is originally supposed to be measured. Accordingly, there is a problem that when the detection current value is applied to the feedback control, an error occurs between a motor target current and the peak value of a current actually flowing to the motor.

Figure 6:
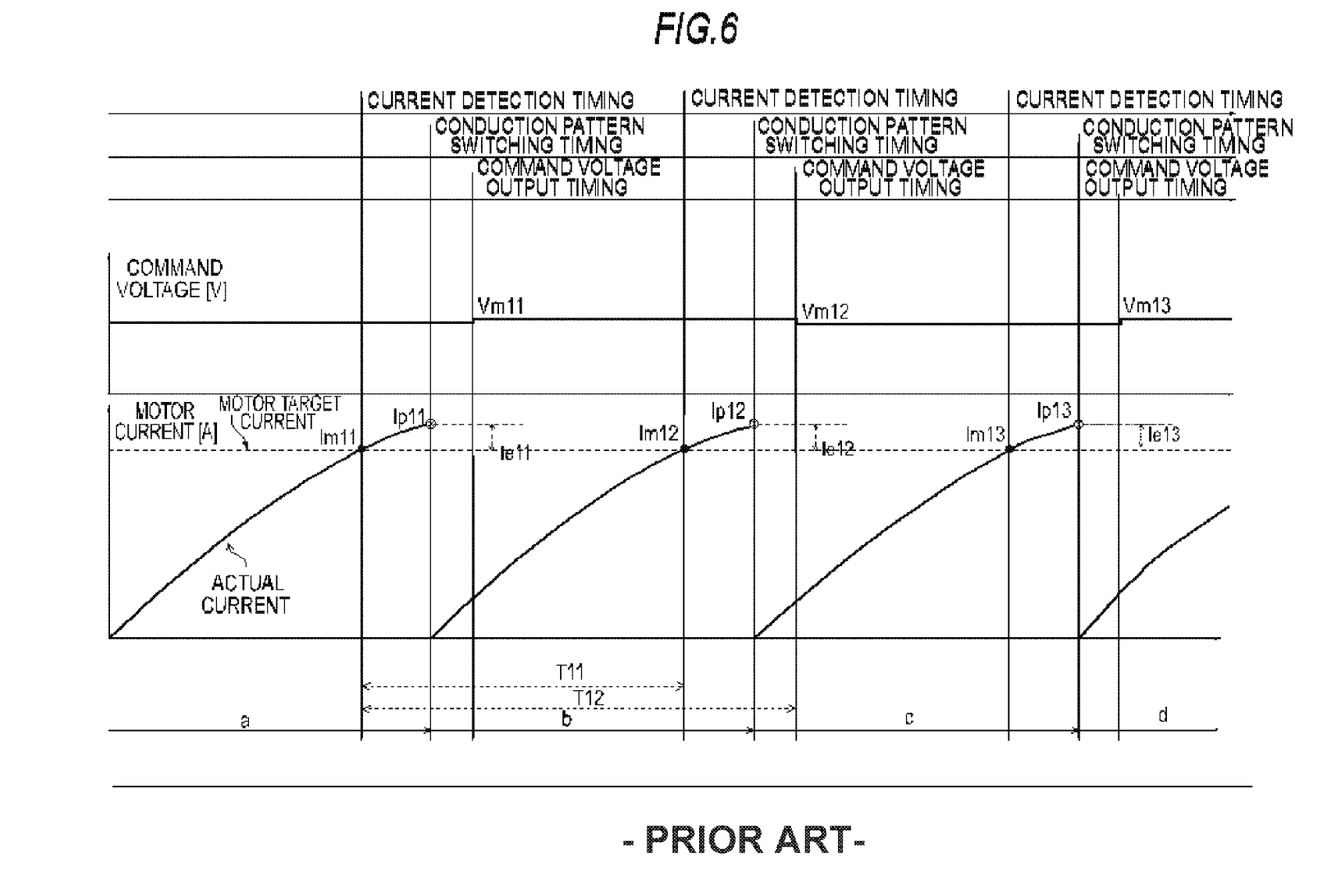
FIG. 6 is a view used to describe a feedback control result in the related art which is a problem to be solved by the motor control device according to the first embedment of the invention.

This problem of the technique in the related art will be described in detail with reference to FIG. 6. FIG. 6 shows a motor current over time in a case where a motor current is detected when conduction patterns of an inverter are switched in synchronization with an edge signal of a hall sensor signal generated at a predetermined motor electrical angle, and a command voltage is outputted by applying the current value thus detected to the feedback control. Referring to FIG. 6, Im11 through Im13 indicate a detection current value detected at the current detection timing, Ip11 through Ip13 indicate a motor current value at the conduction pattern switching timing, and Vm11 through Vm13 indicate a command voltage. Assume that a motor electrical angle advances in periods a, b, c, and d by 60 degrees per period.

By applying the detection current values Im11 through Im13 detected as above to the feedback control, the detection current values Im11 through Im13 are allowed to follow a motor target current (indicated by a dotted line of FIG. 6). However, the command voltage is kept applied for a time from the current detection timing to the conduction pattern switching timing. The motor currents at the conduction pattern switching timing therefore rise to Ip11 through Ip13. Consequently, errors Ie11 through Ie13 occur between the peak values Ip11 through Ip13 of the motor current and the motor target current, respectively.

Also, when a correction calculation is performed using a current detection cycle T11 and a time T12 taken since the current is detected till an applied voltage is actually applied to the motor as in the technique disclosed in Patent Document 2, a result of the correction calculation is limited to a value on a straight line linking the detection current values Im11 through Im13. Hence, the peak values Ip11 through Ip13 of the motor current cannot be calculated.

As has been described, the related art has a problem that an error occurs between the peak value of the motor current and the motor target current because the motor current detected at the current detection timing keeps rising till the conduction pattern switching timing.

Generally, a motor current and an amount of torque of the motor have a proportional relation. Hence, in a case where an error is occurring between the motor current and the motor target current, an error also occurs in an amount of torque of the motor. As has been described above, in order to control a clutch engaging force with accuracy, it is necessary to adjust an amount of torque of the motor with accuracy. Hence, when an error occurs in an amount of torque due to an error occurring between the motor current and the motor target current, there arises a problem that a clutch engaging force cannot be controlled with accuracy. A limit value of error accuracy of the motor current is thus determined by control accuracy of a clutch engaging force.

SUMMARY OF THE INVENTION

The invention was devised to solve the problems discussed above and has an object to provide a motor control device capable of enhancing detection accuracy of a motor current.

A motor control device according to one aspect of the invention is a motor control device that controls a motor by switching conduction patterns by an inverter. The motor control device includes: a current detection portion that is provided to the inverter and detects a current flowing to the motor; a timing measurement portion that measures a conduction pattern switching timing by the inverter and a current detection timing by the current detection portion; and a correction portion that finds a correction current value calculated using a detection current value detected by the current detection portion and the conduction pattern switching timing and the current detection timing measured by the timing measurement portion.

The motor control device of the invention includes the current detection portion that is provided to the inverter and detects a current flowing to the motor; the timing measurement portion that measures a conduction pattern switching timing by the inverter and a current detection timing by the current detection portion; and the correction portion that finds a correction current value calculated using a detection current value detected by the current detection portion and the conduction pattern switching timing and the current detection timing measured by the timing measurement portion. Owing to this configuration, the correction current value found by the correction portion coincides with the motor current. Hence, there is an advantage that a motor control device capable of enhancing detection accuracy of a motor current can be obtained.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, an embodiment of the invention will be described by labeling same or equivalent portions with same reference numerals in respective drawings. In the following, an automatic transmission control device equipped with a motor control device will be described as an example. It should be appreciated, however, that a motor control device of the invention is not limited to the embodiment disclosed herein and is applicable to all devices that require a motor current be detected with accuracy.

First Embodiment

Figure 1:
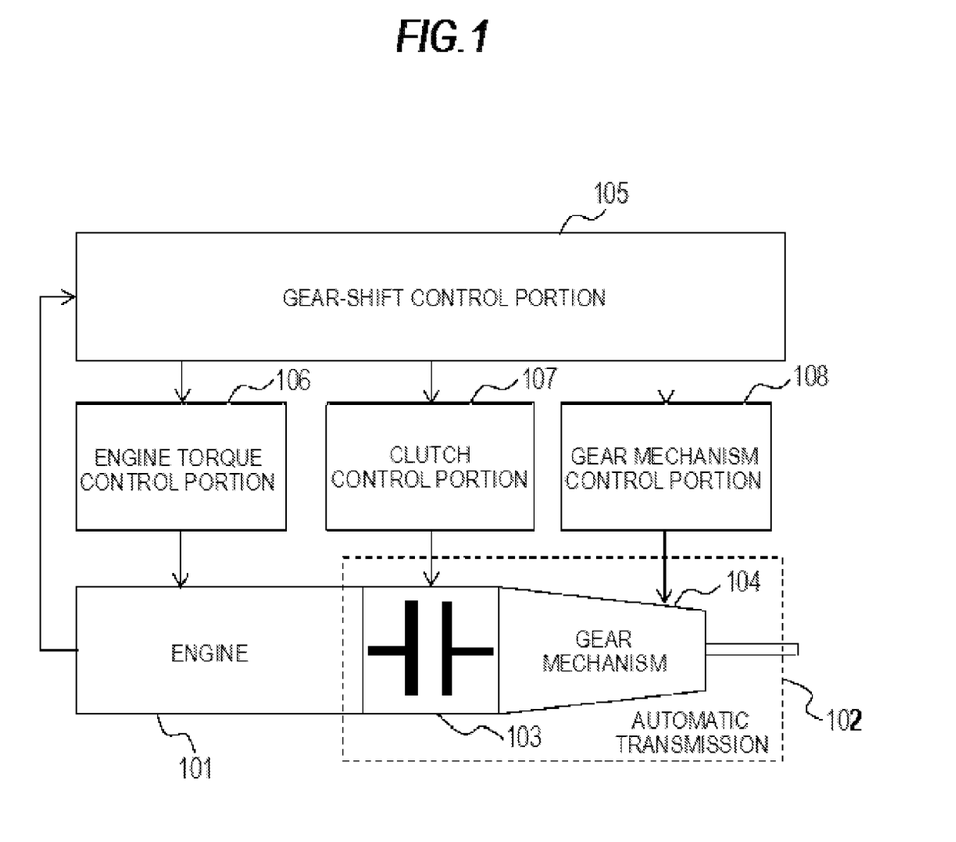
FIG. 1 is a view schematically showing a configuration of an automatic transmission control device equipped with a motor control device according to a first embodiment of the invention.
Figure 2:
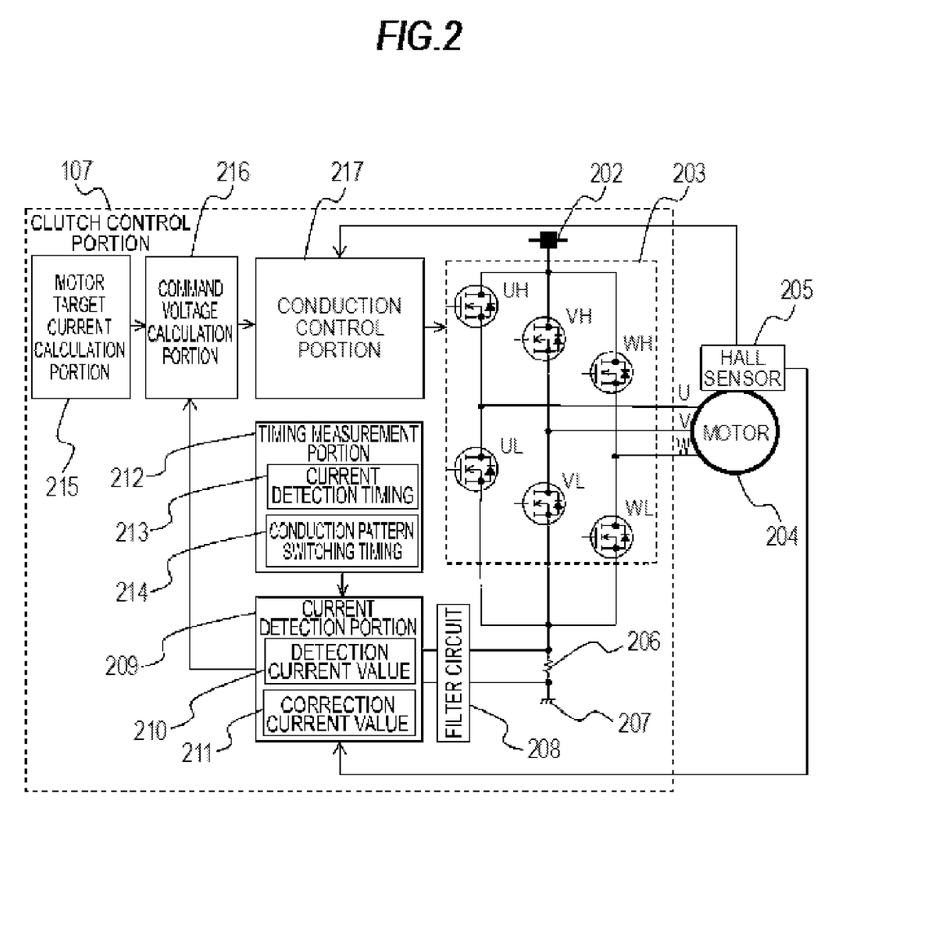
FIG. 2 is a configuration view of a clutch control portion equipped with the motor control device according to the first embodiment of the invention.
Figure 3:
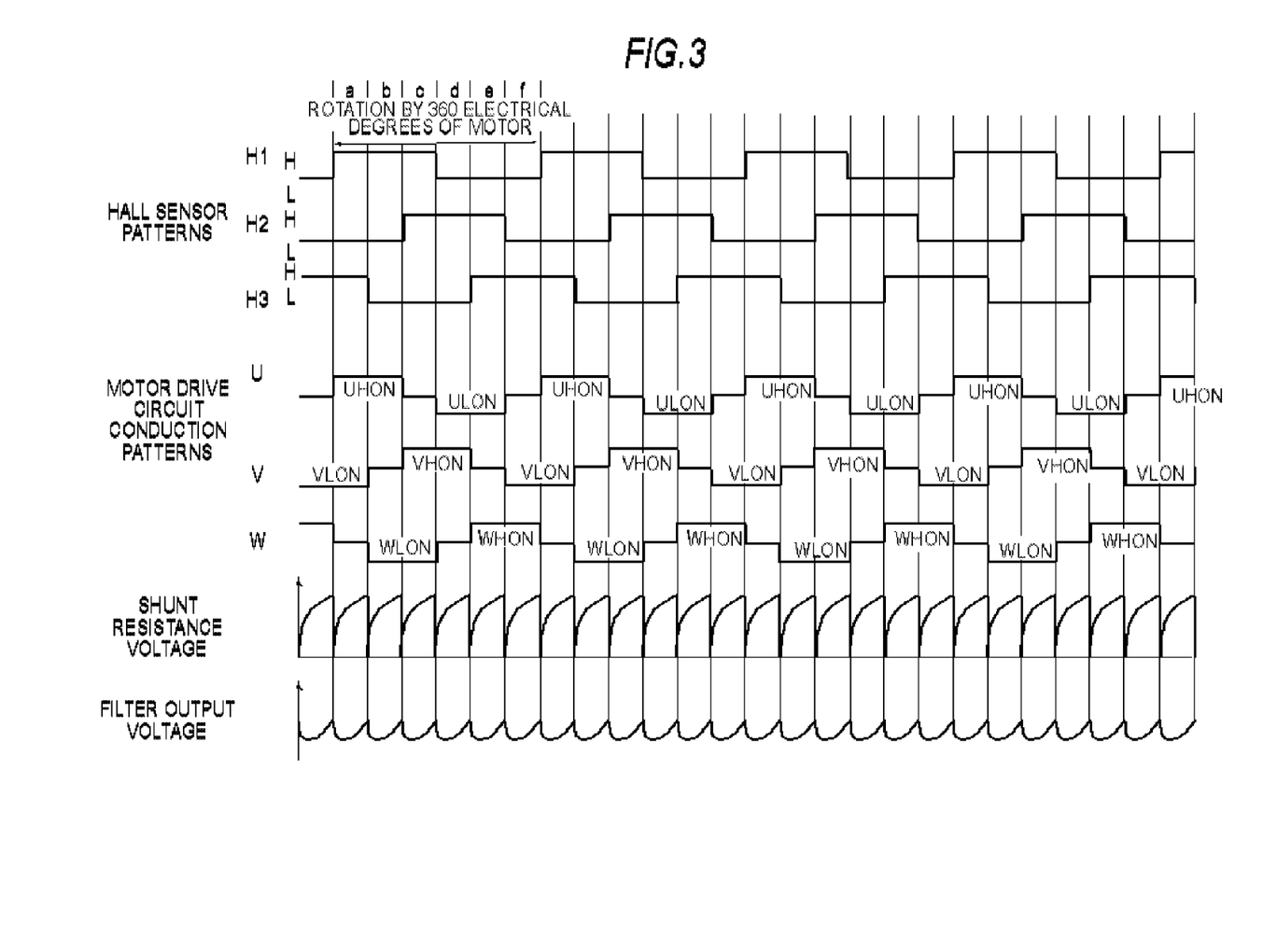
FIG. 3 is a view used to describe a control method of a current flowing to a motor of the motor control device according to the first embodiment of the invention.
Figure 4:
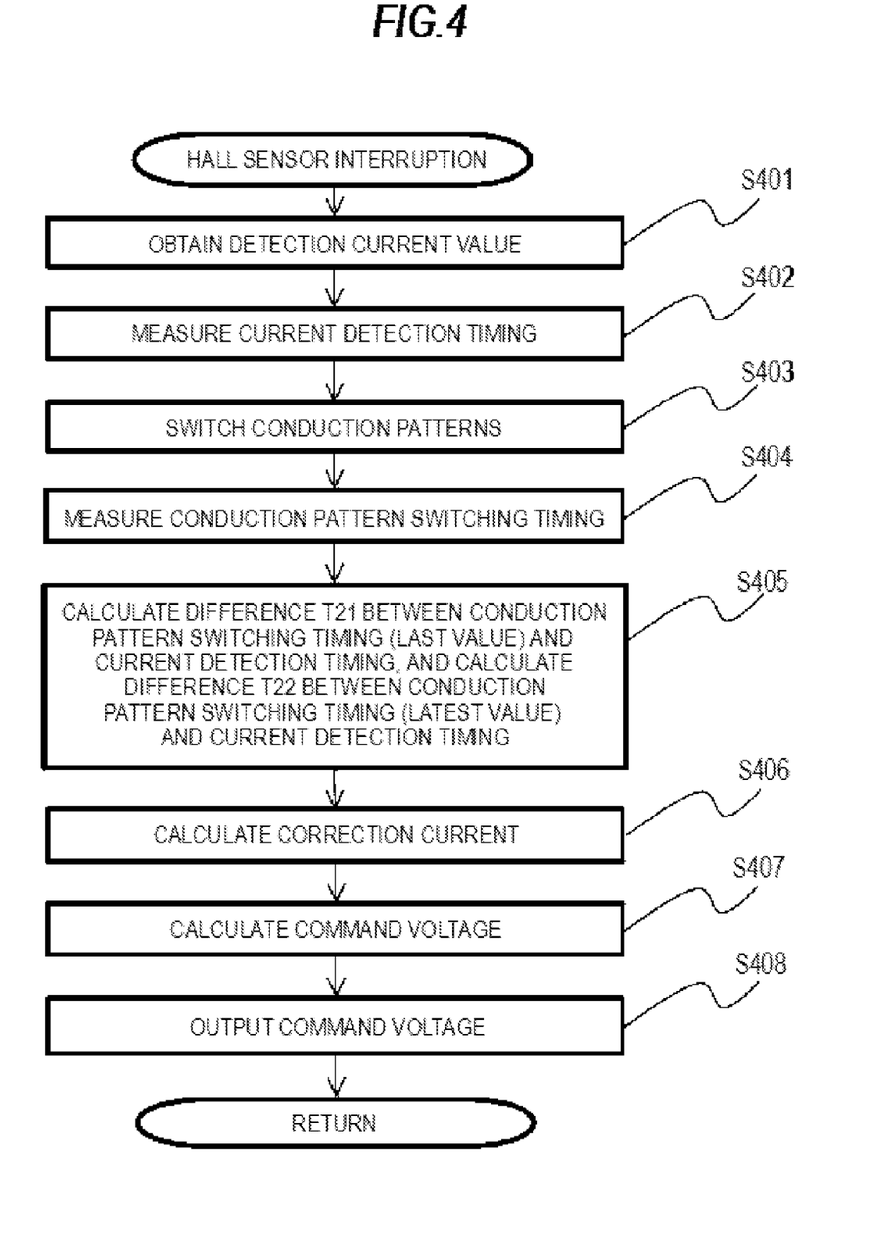
FIG. 4 is a flowchart depicting an operation of a current detection portion and a timing measurement portion in the motor control device according to the first embodiment of the invention.
Figure 5:
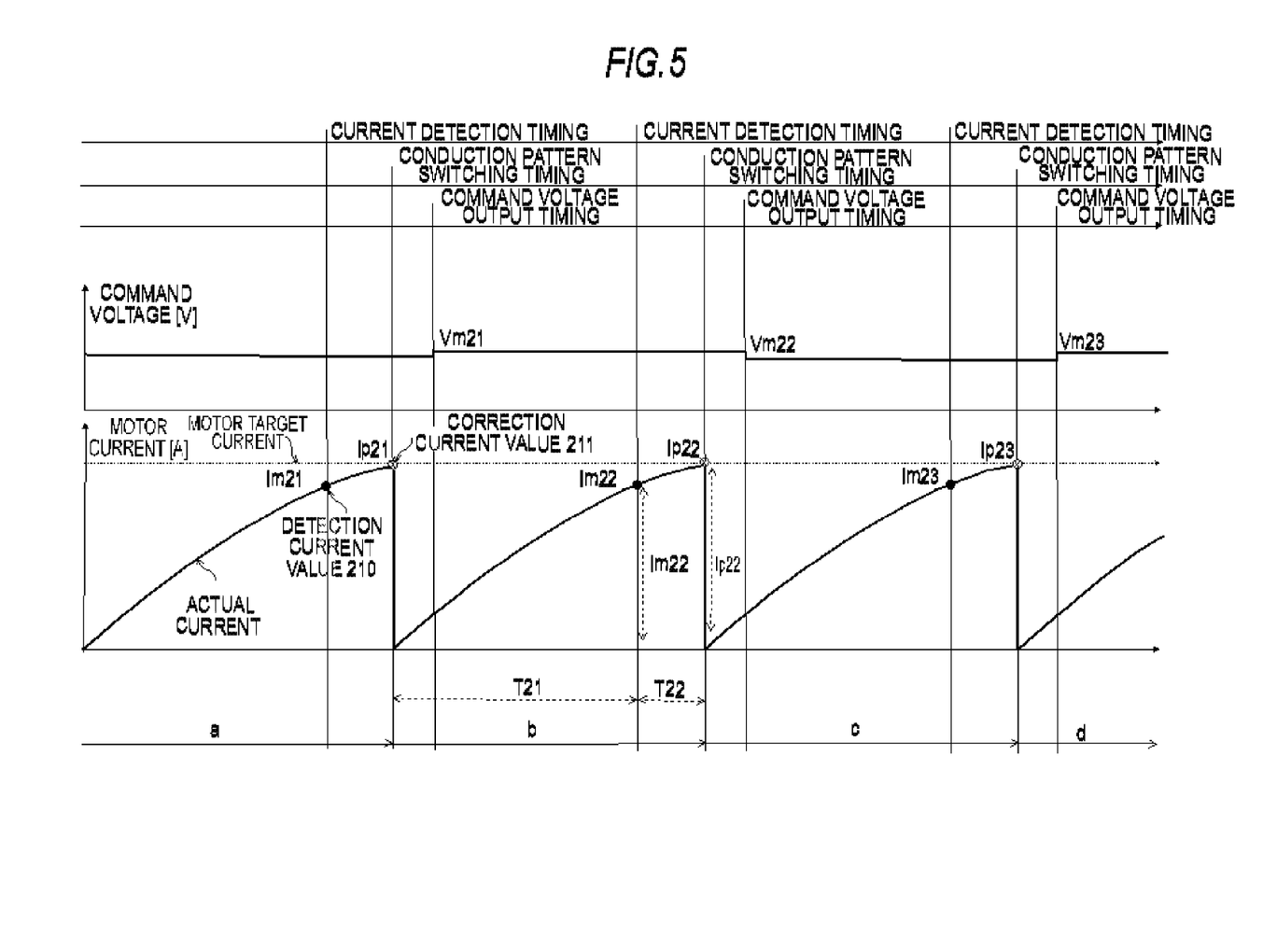
FIG. 5 is a view used to describe a feedback control result in the motor control device according to the first embodiment of the invention.

FIG. 1 is a view schematically showing a configuration of an automatic transmission control device equipped with a motor control device according to a first embodiment of the invention. FIG. 2 is a configuration view of a clutch control portion equipped with the motor control device according to the first embodiment of the invention. FIG. 3 is a view used to describe a control method of a current flowing to a motor of the motor control device according to the first embodiment of the invention. FIG. 4 is a flowchart depicting an operation of a current detection portion and a timing measurement portion in the motor control device according to the first embodiment of the invention. FIG. 5 is a view used to describe a feedback control result in the motor control device according to the first embodiment of the invention.

Referring to FIG. 1, an engine 101 and an automatic transmission 102 are coupled to each other with a clutch 103. The clutch 103 is attached to an input part of the automatic transmission 102 and transmits motive power from the engine 101 to the automatic transmission 102. The automatic transmission 102 is equipped with a gear mechanism 104 that shifts a gear position in the automatic transmission 102.

A gear-shift control portion 105 controls the gear position in the automatic transmission 102 by changing engagement of the clutch 103 and configuration of the gear mechanism 104 in the automatic transmission 102. An engine torque control portion 106 controls an amount of engine torque when the gear is shifted according to an instruction from the gear-shift control portion 105. A clutch control portion 107 includes a motor control portion described below and performs clutch control and control on a clutch engaging force when the gear is shifted according to an instruction from the gear-shift control portion 105. A gear mechanism control portion 108 controls a gear position in the gear mechanism 104 according to an instruction of the gear-shift control portion 105. The clutch control portion 107 is a mechanism in which a rotational angle of a brushless motor described below is proportional to a stroke amount of the clutch 103 and is configured so as to adjust a clutch engaging force by adjusting a rotational angle of the brushless motor by controlling a torque thereof.

In case an engaging force of the clutch 103 becomes unstable, motive power transmitted from the engine 101 to the gear mechanism 104 becomes unstable and eventually motive power transmitted to wheels becomes unstable. A running condition of a vehicle, for example, an automobile, thus becomes unsteady, which makes the driver feel uncomfortable.

The clutch control portion 107 will now be described in detail. FIG. 2 is a block diagram showing a configuration of the clutch control portion 107. The clutch control portion 107 is formed as follows.

A battery 202 supplies electric power to a brushless motor 204 via an inverter 203. A rotor (not shown) of the brushless motor 204 rotates with a supply of electric power.

The brushless motor 204 is equipped with a hall sensor 205, which is an example of a rotation position detection portion that detects a position of the rotor with respect to a stator (not shown) of the brushless motor 204, that is, a rotation position of the brushless motor 204. The hall sensor 205 generates a hall sensor signal corresponding to the position of the rotor with respect to the stator of the brushless motor 204 as described above.

A current detection resistor (hereinafter, referred to as the shunt resistance) 206 is inserted to a lower arm of six FETs forming the inverter 203. A potential difference is generated across the shunt resistance 206 when the brushless motor 204 rotates and a current flows from the battery 202 in a direction to grounding 207 via the brushless motor 204. The potential difference is filtered by a filter circuit 208 to send a voltage signal to a current detection portion 209. The current detection portion 209 detects a detection current value 210 on the basis of data obtained by converting the voltage signal sent from the filter circuit 208 from the analog form to the digital form at every edge of the hall sensor signal. Further, the current detection portion 209 is provided with a correction portion (not shown) to calculate a correction current value 211 using a current detection timing 213 and a conduction pattern switching timing 214 sent from a timing measurement portion 212 and the detection current value 210.

The timing measurement portion 212 measures the current detection timing 213 and the conduction pattern switching timing 214 and outputs these timings to the current detection portion 209.

A command voltage is calculated by inputting the correction current value 211 found through a calculation by the correction portion in the current detection portion 209 and a target current value of the brushless motor 204 calculated by a motor target current calculation portion 215 into a command voltage calculation portion 216. The command voltage as a calculation result is transmitted to a conduction control portion 217.

The conduction control portion 217 generates gate singles of six FETs, that is, UH, UL, VH, VL, WH, and WL, forming the inverter 203 by switching conduction patterns determined by the hall signals. The conduction control portion 217 also controls rotation of the brushless motor 204 by controlling currents of a phase U, a phase V, and a phase W of the brushless motor 204 by changing an output voltage by controlling switching frequencies of the respective FETs according to the command voltage sent from the command voltage calculation portion 216.

A control method of a current to be supplied to the brushless motor 204 will now be described. FIG. 3 is an explanatory view showing signal patterns of the hall sensor 205, conduction patterns of the brushless motor 204, a voltage across the shunt resistance 206, and an output voltage of the filter circuit 208.

As has been described, the brushless motor 204 is equipped with the hall sensor 205 and the hall sensor 205 generates signals indicated by hall sensor patterns H1, H2, and H3 of FIG. 3 according to a position of the rotor with respect to the stator of the brushless motor 204.

The conduction control portion 217 generates conduction patterns indicated by motor drive circuit conduction patterns U, V, and W of FIG. 3 according to a combination of the signals of the hall sensor 205. By giving electric power (voltage) indicated by the conduction pattern U, V, or W to the brushless motor 204, the brushless motor 204 is allowed to rotate in one direction.

For example, a combination in the period a includes the hall sensor pattern H1 exhibiting "H", the hall sensor pattern H2 exhibiting "L", and the hall sensor pattern H3 exhibiting "H". An instruction in this case is to turn ON the gate signals of UH and VL among the respective FETs forming the inverter 203. Consequently, a current flows in the brushless motor 204 from the phase U to the phase V.

A combination of the signal patterns of the hall sensor 205 in the following period b includes the hall sensor pattern H1 exhibiting "H", the hall sensor pattern H2 exhibiting "L", and the hall sensor pattern H3 exhibiting "L". An instruction in this case is to turn ON the gate signals of UH and WL among the respective FETs forming the inverter 203. Consequently, a current flows in the brushless motor 204 from the phase U to the phase W.

A combination of the signal patterns of the hall sensor 205 in the following period c includes the hall sensor pattern H1 exhibiting "H", the hall sensor pattern H2 exhibiting "H", and the hall sensor pattern H3 exhibiting "L". An instruction in this case is to turn ON the gate signals of VH and WL among the respective FETs forming the inverter 203. Consequently, a current flows in the brushless motor 204 from the phase V to the phase W.

A combination of the signal patterns of the hall sensor 205 in the following period d includes the hall sensor pattern H1 exhibiting "L", the hall sensor pattern H2 exhibiting "H", and the hall sensor pattern H3 exhibiting "L". An instruction in this case is to turn ON the gate signals of VH and UL among the respective FETs forming the inverter 203. Consequently, a current flows in the brushless motor 204 from the phase V to the phase U.

A combination of the signal patterns of the hall sensor 205 in the following period e includes the hall sensor pattern H1 exhibiting "L", the hall sensor pattern H2 exhibiting "H", and the hall sensor pattern H3 exhibiting "H". An instruction in this case is to turn ON the gate signals of WH and UL among the respective FETs forming the inverter 203. Consequently, a current flows in the brushless motor 204 from the phase W to the phase U.

A combination of the signal patterns of the hall sensor 205 in the following period f includes the hall sensor pattern H1 exhibiting "L", the hall sensor pattern H2 exhibiting "L", and the hall sensor pattern H3 exhibiting "H". An instruction in this case is to turn ON the gate signals of WH and VL among the respective FETs forming the inverter 203. Consequently, a current flows in the brushless motor 204 from the phase W to the phase V.

The brushless motor 204 rotates by sequentially repeating six conduction patterns of the brushless motor 204 in the periods a through f in the order "a→b→c→d→e→f→a".

Regarding the number of rising edges and falling edges of the hall sensor patterns H1, H2, and H3 during the periods a through f, there are six edges per 360 electrical degrees, that is, per rotation of the brushless motor 204 in this embodiment. In short, an edge is generated at every 60 electrical degrees.

A shunt resistance voltage and a filter output voltage of FIG. 3 will now be described. When a current is passed through the brushless motor 204 according to the six conduction patterns described above, a motor current corresponding to the command voltage flows through the brushless motor 204. A voltage across the shunt resistance 206 varies with an amount of current that has flown. On the other hand, because the current-flowing phases are switched every time the conduction patterns are switched, a voltage drop occurs in the shunt resistance voltage shown in FIG. 3. Also, when the current is detected, the clutch control portion 107 removes noises from the shunt resistance voltage by means of the filter circuit 208 and converts the current from the analog form to the digital form at the timing of the edge of the hall sensor 205.

When a current is calculated, the filter output voltage is converted from the analog form to the digital form, so that a current value is found by loading the resulting data into a microcomputer (not shown) or the like and multiplying the data by a coefficient.

An operation of the current detection portion 209, the timing measurement portion 212, and the feedback control will now be described using the flowchart of FIG. 4. FIG. 4 shows a case where sampling timing of a current value is set at every 60 electrical degrees. These portions are actuated by an interruption taking place for every edge signal of the hall sensor 205 equipped to the brushless motor 204.

In Step S401, the current detection portion 209 calculates the detection current value 210 at the timing of an edge signal of the hall sensor 205 by multiplying a voltage value, which is obtained by converting a voltage outputted from the filter circuit 208 from the analog form to the digital form, by a predetermined coefficient.

The current detection timing 213 is measured by the timing measurement portion 212 in Step S402.

The conduction patterns of the inverter 203 are switched by the conduction control portion 217 in Step S403.

In Step S404, the last value of the conduction pattern switching timing 214 is stored in a memory (not shown) and the latest conduction pattern switching timing 214 is measured by the timing measurement portion 212.

In Step S405, the correction portion (not shown) provided inside the current detection portion 209 calculates a differential time T21 between the current detection timing 213 measured in Step S402 and the last value of the conduction pattern switching timing 214 stored into the memory in Step S404 and a differential time T22 between the conduction pattern switching timing 214 (latest value) measured in Step S404 and the current detection timing 213 measured in Step S402. The correction portion used in this step may be provided inside the timing measurement portion 212.

In Step S406, the correction portion (not shown) provided inside the current detection portion 209 calculates the correction current value 211 in accordance with Equation (1) as below using the T21 and T22 calculated in Step S405 and the detection current value 210 calculated in Step S401. Equation (1) below is a calculation formula taking advantage of the fact that a ratio between T21 and T22 is equal to a ratio between the detection current value 210 and the correction current value 211, where Ip is given as the correction current value 211 and Im as the detection current value 210.

$$Ip=((T21+T22)\div T21)\times Im \quad (1)$$

In Step S407, the command voltage calculation portion 216 calculates a command voltage from a differential current between the motor target current calculated by the motor target current calculation portion 215 and the correction current value 211 calculated by the correction portion in Step S406.

The flow subsequently proceeds to Step S408, in which the conduction control portion 217 drives the inverter 203 according to the command voltage calculated by and outputted from the command voltage calculation portion 216 in Step S407. The current feedback control is performed in this manner and a hall sensor interruption routine is ended.

As has been described above, in every interruption of the edge signal of the hall sensor 205, that is, every time the brushless motor 204 rotates by 60 electrical degrees, the correction current value 211 is calculated by the correction portion and the command voltage is calculated by the command voltage calculation portion 216. Rotation of the brushless motor 204 is controlled by driving the inverter 203 via the conduction control portion 217 according to the command voltage thus calculated.

FIG. 5 shows a current feedback control result in a case where the current is sampled at the timing of an edge signal of the hall sensor 205 in the automatic transmission control device of this embodiment. This is an explanatory view corresponding to FIG. 6 in the related art referred to when the problems to be solved by the invention was described above. The periods a through d are the same as the periods a through d of FIG. 3, respectively.

According to the motor control device of the invention described above, the correction current value 211 (Ip21 through Ip23) is calculated in accordance with Equation (1) above using the differential time T21 from the last conduction pattern switching timing 214 to the current detection timing 213, the differential time T22 from the current detection timing 213 to the latest conduction pattern switching timing 214, and the current detection value 210 (Im21 through Im23), and the inverter 203 is driven according to the command voltage (Vm21 through Vm23) calculated from the correction current value 211 (Ip21 through Ip23) and the motor target current. Owing to this configuration, an error between the motor current and the motor target current can be suppressed.

As has been described in detail, according to the automatic transmission control device of this embodiment, an error between the motor current and the motor target current can be suppressed in comparison with the device in the related art, and a torque error at the clutch 103 can be therefore lessened. Hence, an engaging force of the clutch 103 can be controlled with accuracy and motive power transmitted to the wheels become stable. Hence, satisfactory running can be achieved without making the driver feel uncomfortable.

The above has described a case where the automatic transmission control device is controlled by the brushless motor as one embodiment of the invention. It should be appreciated, however, that other equivalent motors can be used as well. That is, the invention includes various design modifications without departing from the scope and sprit of the invention. Also, the embodiment above has described a case where the correction portion is provided inside the current detection portion 209. However, the correction portion may be provided independently, for example, between the current detection portion 209 and the command voltage calculation portion 216. Further, the embodiment above has described a case where the motor control device is used in the automatic transmission mounted to a vehicle, such as an automobile. It should be appreciated, however, that the motor control device of the invention is applicable to all devices that require a motor current be detected with accuracy.

Various modifications and alterations of this invention will be apparent to those skilled in the art without departing from the scope and spirit of this invention, and it should be understood that this is not limited to the illustrative embodiment set forth herein.

What is claimed is:

1. A motor control device that controls a motor by switching conduction patterns of an inverter, comprising:
   a rotation position detector configured to detect a rotation position of the motor;
   a current detector configured to detect a current flowing to the motor at a current detection timing in response to the detected rotation position; and
   a timing measure configured to measure a conduction pattern switching timing of the inverter and the current detection timing of the current detector;
   wherein the current detector is further configured to calculate a correction current value based on the detected current value, the measured conduction pattern switching timing, and the measured current detection timing.

2. The motor control device according to claim 1, wherein: the conduction pattern switching timing comprises the latest conduction pattern switching timing and the second latest conduction pattern switching timing, the correction current value Ip is calculated in accordance Equation (1)

$$Ip = (T21 + T22)/T21 * Im \quad (1)$$

where T21 is a time difference between the second latest conduction pattern switching timing and the current detection timing, T22 is a time difference between the current detection timing and the latest conduction pattern switching timing, and Im is the detected current value.

3. The motor control device according to claim 1, further comprising:
a command voltage calculator configured to calculate a command voltage to the inverter based on a current difference between the correction current value and a target current value of the motor.

* * * * *